United States Patent
Cao et al.

(10) Patent No.: US 9,251,434 B2
(45) Date of Patent: Feb. 2, 2016

(54) TECHNIQUES FOR SPATIAL SEMANTIC ATTRIBUTE MATCHING FOR LOCATION IDENTIFICATION

(71) Applicant: International Business Machines Corporation, Armonk, NY (US)

(72) Inventors: Liangliang Cao, Amherst, MA (US); Noel C. F. Codella, Lagrangeville, NY (US); Gang Hua, Livingston, NJ (US); Gong Leiguang, New Brunswick, NJ (US); Apostol I. Natsev, Saratoga, CA (US); John R. Smith, New York, NY (US)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 13/788,433

(22) Filed: Mar. 7, 2013

(65) Prior Publication Data

US 2014/0161360 A1 Jun. 12, 2014

Related U.S. Application Data

(63) Continuation of application No. 13/710,392, filed on Dec. 10, 2012.

(51) Int. Cl.
 *G06K 9/00* (2006.01)
 *G06K 9/62* (2006.01)

(52) U.S. Cl.
 CPC ............ *G06K 9/6202* (2013.01); *G06K 9/0063* (2013.01); *G06K 9/00684* (2013.01); *G06K 9/6263* (2013.01); *G06K 9/6288* (2013.01)

(58) Field of Classification Search
 CPC .......... G06K 9/00416; G06K 9/00429; G06K 9/00637; G06K 9/6202; G06F 17/30265
 USPC ............................ 382/224, 209, 103; 707/769
 See application file for complete search history.

(56) References Cited

U.S. PATENT DOCUMENTS

| | | | |
|---|---|---|---|
| 6,446,060 B1* | 9/2002 | Bergman et al. ............... | 707/770 |
| 6,591,007 B1* | 7/2003 | Petkovic et al. ............... | 382/162 |
| 6,597,818 B2 | 7/2003 | Kumar et al. | |
| 6,691,126 B1 | 2/2004 | Syeda-Mahmood | |
| 7,124,149 B2 | 10/2006 | Smith et al. | |
| 2002/0090148 A1* | 7/2002 | Pass et al. ..................... | 382/305 |
| 2007/0258642 A1 | 11/2007 | Thota | |

(Continued)

OTHER PUBLICATIONS

A. Natsev et al., "IBM multimedia analysis and retrieval system," ACM International Conference on Content based Image and Video Retrieval (CIVR'2008), pp. 553-554, Jul. 7-9, 2008.

(Continued)

*Primary Examiner* — Manuchehr Rahmjoo
(74) *Attorney, Agent, or Firm* — Daniel P. Morris; Michael J. Chang, LLC

(57) ABSTRACT

Techniques for spatial semantic attribute matching on image regions for location identification based on a reference dataset are provided. In one aspect, a method for matching images from heterogeneous sources is provided. The method includes the steps of: (a) parsing the images into different semantic labeled regions; (b) creating a list of potential matches by matching the images based on two or more of the images having same semantic labeled regions; and (c) pruning the list of potential matches created in step (b) by taking into consideration spatial arrangements of the semantic labeled regions in the images.

20 Claims, 6 Drawing Sheets

(56) References Cited

U.S. PATENT DOCUMENTS

| | | | |
|---|---|---|---|
| 2010/0303338 | A1 | 12/2010 | Stojancic et al. |
| 2011/0103699 | A1* | 5/2011 | Ke et al. ............... 382/209 |
| 2011/0135207 | A1 | 6/2011 | Flynn et al. |
| 2011/0320454 | A1 | 12/2011 | Hill et al. |
| 2012/0269432 | A1 | 10/2012 | Wang et al. |

OTHER PUBLICATIONS

N. Kumar et al., "Attribute and Simile Classifiers for Face Verification," Proc. IEEE International Conference on Computer Vision (ICCV'2009), Kyoto, Japan, Oct. 2009.

B. Siddiquie et al., "Image Ranking and Retrieval based on Multi-Attribute Queries," Proc. IEEE Conference on Computer Vision and Pattern Recognition (CVPR'2011), Colorado Springs, CO, Jun. 2011.

M. Douze et al., "Combining attributes and Fisher vectors for efficient image retrieval," IEEE Conference on Computer Vision and Pattern Recognition (CVPR'2011), Colorado Springs, 2011.

J. Liu et al., "Recognizing Human Actions by Attributes," Proc. IEEE Conference on Computer Vision and Pattern Recognition (CVPR'2011), Colorado Springs, 2011.

S. Dhar et al., "High Level Describable Attributes for Predicting Aesthetics and Interestingness," Proc. IEEE Conference on Computer Vision and Pattern Recognition (CVPR'2011), Colorado Springs, 2011.

W. Zhang et al., "Discriminative Image Warping with Attribute Flow," Proc. IEEE Conference on Computer Vision and Pattern Recognition (CVPR'2011), Colorado Springs, 2011.

J. Janssen et al., "Estimating node similarity from co-citation in a graph model," SAC '10 Mar. 22-26, 2012, Sierre, Switzerland.

Yan et al., "Large-Scale Multimedia Semantic Concept Modeling using Robust Subspace Bagging and MapReduce," LS-MMRM '09 Proceedings of the First ACM workshop on Large-scale multimedia retrieval and mining, pp. 35-42 (Oct. 2009).

Herndon Jr., RM. et al.; "An Interpretive Technique for Evaluating Functional Attribute Grammars," IPCOM000128580D Dec. 31, 1986.

Codella et al., "Video Event Detection Using Temporal Pyramids of Visual Semantics with Kernel Optimization and Model Subspace Boosting," 2012 IEEE International Conference on Multimedia and Expo (ICME), Melbourne, VIC Australia, Jul. 9-13, 2012.

A. Natsev et al., "Semantic Concept-Based Query Expansion and Re-ranking for Multimedia Retrieval, A Comparative Review and New Approaches," Proceedings of the 15th International conference on Multimedia (Multimedia '07) pp. 991-1000, Sep. 23-28, 2007.

R. Yan, "Model-Shared Subspace Boosting for Multi-label Classification," KDD '07. Aug. 12-15, 2007.

R. Yan, "Transfer Learning using Task-Level Features with Application to Information Retrieval," Twenty-First International Joint Conference on Artificial Intelligence Jun. 2009.

Codella et al., "Towards Large Scale Land-cover Recognition of Satellite Images," 2011 8th International Conference on Information, Communications and Signal Processing (ICICS), Dec. 13-16, 2011.

Johansson, I. et al., "Negotiation of Generic Image Attributes in the Session Description Protocol (SDP)," IPCOM/000207562 May 1, 2011.

Ravishankar, CV. et al., "An Attribute-Based Service-Request Mechanism for Heterogeneous Distributed Systems," IPCOM000128496D Jan. 1, 1988.

Bansal et al., "Geo-Localization of Street Views with Aerial Image Databases," MM'11, Nov. 28-Dec. 1, 2011, Scottsdale, Arizona.

* cited by examiner

GROUND LEVEL IMAGE

SATELLITE IMAGE

TECHNIQUES FOR SPATIAL SEMANTIC ATTRIBUTE MATCHING FOR LOCATION IDENTIFICATION

CROSS-REFERENCE TO RELATED APPLICATION(S)

This application is a continuation of U.S. application Ser. No. 13/710,392 filed on Dec. 10, 2012, the disclosure of which is incorporated by reference herein.

FIELD OF THE INVENTION

The present invention relates to geolocating of photos and more particularly, to techniques for spatial semantic attribute matching on image regions for location identification based on a reference dataset.

BACKGROUND OF THE INVENTION

The geo-localization of photos has become an emerging need. Usually the query photos are matched with a geo-referenced dataset to obtain a prediction of the geo-location. However, robust matching of images of different types and across different views based purely on low level features is in general difficult to achieve.

Therefore, improved techniques for geo-locating photos would be desirable.

SUMMARY OF THE INVENTION

The present invention provides techniques for spatial semantic attribute matching on image regions for location identification based on a reference dataset. In one aspect of the invention, a method for matching images from heterogeneous sources is provided. The method includes the steps of: (a) parsing the images into different semantic labeled regions; (b) creating a list of potential matches by matching the images based on two or more of the images having same semantic labeled regions; and (c) pruning the list of potential matches created in step (b) by taking into consideration spatial arrangements of the semantic labeled regions in the images. The method may further include the steps of: building an inverted file index for the semantic labeled regions; and using the inverted file index to in step (b) create the list of potential matches and/or the method may further include the step of: using a geometric hashing index to in step (c) prune the list of potential matches by taking into consideration the spatial arrangements of the semantic labeled regions in the images.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for spatial semantic attribute matching on image regions for location identification of images in the wild based on some given reference dataset. As will be described in detail below, IMARS-based semantic classifiers may be utilized to automatically or semi-automatically parse an image from any source into semantic labeled image regions. IMARS is described, for example, in A. Natsev et al., "IBM multimedia analysis and retrieval system," ACM International Conference on Content based Image and Video Retrieval (CIVR'2008), pp. 553-554, 2008 (herein "Natsev"), the contents of which are incorporated by reference herein.

Semantic attribute based matching has become popular for visual recognition research in the past several years. Successful applications including face recognition, image search and retrieval, action recognition, visual aesthetics appraisal, etc., to name a few. See, for example, N. Kumar et al., "Attribute and Simile Classifiers for Face Verification," Proc. IEEE International Conference on Computer Vision (ICCV'2009), Kyoto, Japan, October 2009 (facial recognition); B. Siddiquie et al., "Image Ranking and Retrieval based on Multi-Attribute Queries," Proc. IEEE Conference on Computer Vision and Pattern Recognition (CVPR'2011), Colorado Springs, Colo., June 2011 and M. Douze et al., "Combining attributes and Fisher vectors for efficient image retrieval," IEEE Conference on Computer Vision and Pattern Recognition (CVPR'2011), Colorado Springs, 2011 (image search and retrieval); J. Liu et al., "Recognizing Human Actions by Attributes," Proc. IEEE Conference on Computer Vision and Pattern Recognition (CVPR'2011), Colorado Springs, 2011 (action recognition); and S. Dhar et al., "High Level Describable Attributes for Predicting Aesthetics and Interestingness," Proc. IEEE Conference on Computer Vision and Pattern Recognition (CVPR'2011), Colorado Springs, 2011 (visual aesthetic appraisal). Some previous work also utilized low level image attributes, such as a histogram of oriented gradient, for image warping. See, for example, W. Zhang et al., "Discriminative Image Warping with Attribute Flow," Proc. IEEE Conference on Computer Vision and Pattern Recognition (CVPR'2011), Colorado Springs, 2011. None of these teachings however address semantic attribute matching on image regions for location identification of images in the wild.

Figure 1:
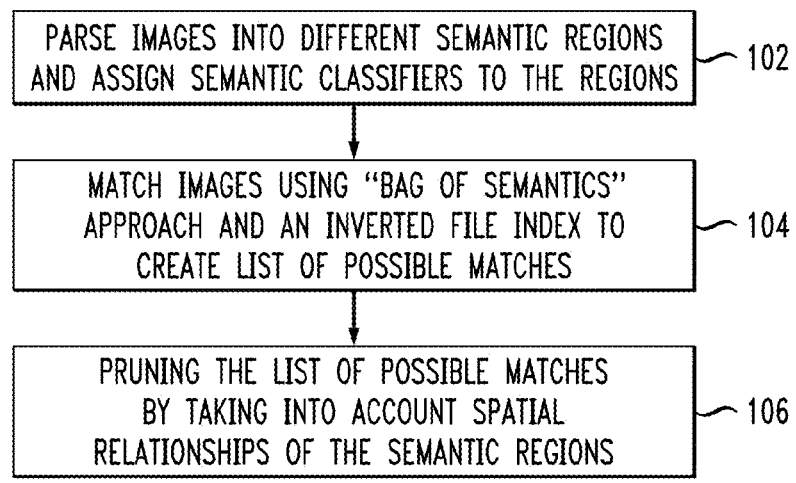
FIG. 1 is a diagram illustrating an exemplary methodology for matching images from heterogeneous sources, such as a query (ground-level) image with reference (satellite) images according to an embodiment of the present invention.

In order to bridge the matching between different image sources for robust location identification, the present techniques utilize semantic attributes along with their spatial layout to match ground level images to any other type of geo-reference images, such as ground-level images, birds-eye view images, satellite images, aerial images, terrain maps, etc. For example, an overview of the present techniques is provided in FIG. 1. FIG. 1 is a diagram illustrating exemplary methodology 100 for matching images from heterogeneous sources. By heterogeneous sources it is meant that the images can be from different sources. For instance, the present techniques can be used to accurately and efficiently match ground level photographs with satellite photos, aerial photos, etc. By way of example only, in one exemplary embodiment the present image matching techniques are used to geo-locate a query image of an unknown location based on matching the query image with reference images of known locations (which, e.g., are contained in a geo-reference database). The matching reference images then provide a list of candidate locations for the query image. For example, using the present techniques, the location of a ground level photograph can be easily ascertained based on matching with reference satellite images in a geo-reference database.

In step 102, the images are parsed into one or more different (spatially connected) semantic regions (i.e., regions of different semantic attributes) and semantic labels are assigned to the semantic regions. As will be described in detail below, in one exemplary embodiment IMARS-based semantic classifiers are used to label the images.

The types of semantics labels can include, but are not limited to, "BEACH SAND," "SAND," "SEA WATER," "SKY," "PIER," "PARKING," "WATER," "DESERT," "ROAD," "MOUNTAIN," "ROCK," "TREES," "GRASS," "BUILDINGS," "PAVEMENT," etc.—just to provide a few examples of IMARS-based semantic labels/classifiers. Of course, this is not an exhaustive list of all of the possible semantic classifiers, but is being provided merely to illustrate what kinds of semantic classifiers might be used. Exemplary semantic classifiers that may be used herein to label the semantic regions in the images are provided in U.S. Pat. No. 7,124,149 issued to Smith et al., entitled "Method and Apparatus for Content Representation and Retrieval in Concept Model Space" (hereinafter "U.S. Pat. No. 7,124,149"), the contents of which are incorporated by reference herein.

As highlighted above, according to an exemplary embodiment, the processing of the images is performed using IMARS. IMARS—the IBM Multimedia Analysis and Retrieval System—is a system that can be used to automatically index, classify, and search large collections of digital images and videos. IMARS works by analyzing visual features of the images and videos, and subsequently allows them to be automatically organized and searched based on their visual content. IMARS includes the IMARS extraction tool and the IMARS search tool. The IMARS extraction tool takes a collection of images and videos from the user, and produces indexes based on mathematical analyses of each piece of content. These indexes organize the results of the analyses for the IMARS search tool. IMARS also permits users to define categories. Thus, the processing of the query image/reference images, e.g., through IMARS, can permit user interaction.

In the exemplary implementation of the present techniques provided above where geo-location of a query image of an unknown location is performed using a geo-reference database of reference images of known locations, both the query image and the reference images are in this step parsed into different semantic regions using, e.g., IMARS-based semantic classifiers. For runtime efficiency, it is however preferable to pre-process the reference images in the geo-reference database. According to an exemplary embodiment, the query image is a ground-level image of an unknown location, and the semantic labels (or classifiers) assigned to the query image in this step are ground-level semantic classifiers (see below).

Figure 2A:
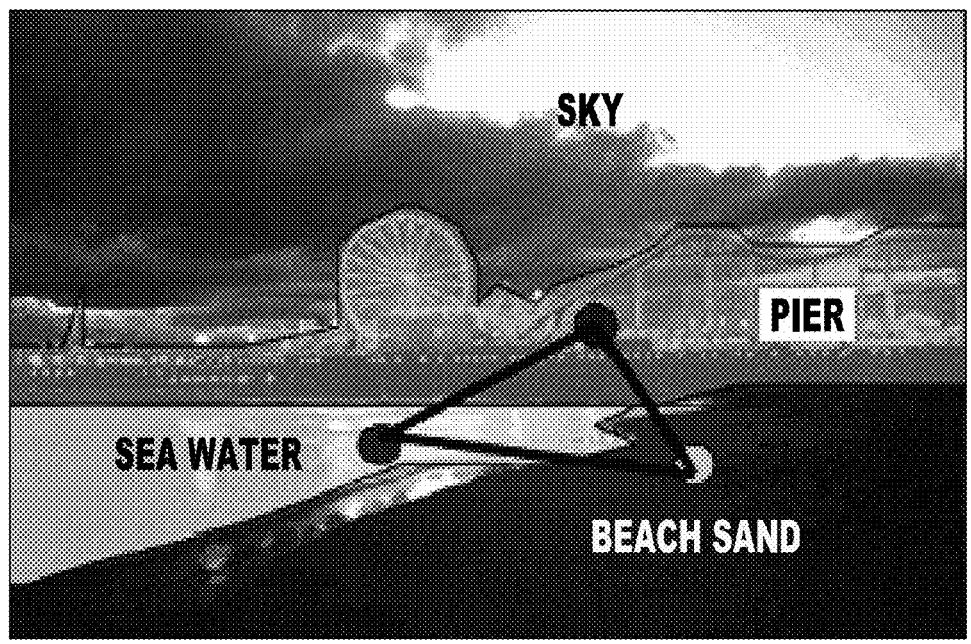
FIG. 2A is a diagram illustrating an exemplary query ground-level image having been parsed into different semantic regions and semantic labels having been assigned to the regions according to an embodiment of the present invention.

An example of a query ground level image having been parsed into different semantic regions is provided in FIG. 2A. An example of a satellite reference image from a geo-reference database having been parsed into different semantic regions is provided in FIG. 2B.

In step 104, a list of potential matches is created by matching the images based on two or more of the images having the same semantic labeled regions. According to an exemplary embodiment, the images in the list are ranked. For instance, a score is produced which is determined by how similar the semantic regions are between the images. Take for example the above-described exemplary implementation involving matching of a query image to a database of reference images. A score is produced which is determined by how similar the semantic regions are between the query image and a given one of the reference images. All the images in the reference data set are then ranked against the query image by this score. The scores are determined relatively. The method to evaluate each of the images produces an absolute, unit-less score. Probability of a match is measured by how high this score is relative to its peers, i.e., (score−lowest score)/(highest score−lowest score). If all the images are "ranked," relative to each other in terms of their "score," then those with a higher rank are more likely matches than those on the list with a lower rank. Thus, the list ranks the possible matches by probability.

As will be described in detail below, this scoring approach is referred to herein as a "bag of semantics" process. Use of a "bag of semantics," i.e., a structure-free, representation of the images, uniquely and advantageously permits use of inverted file indexing to quickly make the matches. In the exemplary implementation of the present techniques provided above where geo-location of a query image of an unknown location is performed using a geo-reference database of reference images of known locations, the semantic labeled regions from the query image are matched against those in the reference images to find matches.

As will be described in detail below, each of the potential matches can be evaluated and a score is associated with the match. Thus, when a final list of matches is provided to an analyst (see below), the analyst will be able to evaluate the matches based on their scores.

As highlighted above, according to an exemplary embodiment, step 104 is performed using a "bag of semantics" approach where the images are represented by the semantic regions they contain and, for each type of semantic region, by the number of image regions that is assigned that semantic label. This resultant analysis produces a vector, wherein for each element the vector represents a single type of semantic region, and the vector's value represents the number of image regions assigned with that semantic label. Using the geo-location scenario provided above, if the query image (by way of step 102) is parsed into semantic regions labeled with the classifiers "BEACH SAND," "SEA WATER," "SKY," and "PIER," then in step 104 these semantic classifiers are matched with the semantic classifiers used to label the regions in the reference images.

This "bag of semantics" approach is taken to quickly prune down (fast-pruning) the list of potential matches. Namely, images that are low quality matches can be removed at this step, thus greatly reducing processing time. As will be described in detail below, the list of possible matches will be further pruned based on the spatial arrangement of the semantic regions.

With regard to the exemplary geo-location scenario described above, the goal is to use the present techniques to come up with a list of potential candidate locations of the query image. Using the "bag of semantics" approach the list of possible candidate locations can be pruned in a fast manner by eliminating reference images of locations that are highly unlikely matches from consideration. For instance, using the example above, the L2 distance can be used to gauge similarity between images (e.g., between the query image and reference images). The Top-N similar images (where N can be varied) can be selected for further processing, while the rest are discarded. In the example provided in FIGS. 2A and 2B, described below, there are three matching semantic regions between the query image and the reference image. In that example, had there been only 1 or 2 matching regions, the geometric verification step (see below) would not be performed. But a list of the candidate locations can still be performed by considering how many matching regions each location has. It is notable that here reference is being made to the number of matched regions instead of the number of types of matched regions. Even if there are only 2 types of semantic region matched, there could still be more than 2 matched regions (one type of semantic region can have multiple disconnected regions in an image).

Due to the spatial structure-free representation, the "bag of semantics" approach permits the building of inverted file indexing for the database images. An inverted file index maps content to its location in a database file. For instance, an inverted file index can map words to documents in which the words appear. An inverted file index is commonly employed in search engines.

In this case, the inverted file index maps semantic classifiers (e.g., "BEACH SAND," "SEA WATER," "SKY," "PIER," etc.) with semantic regions in the images. Take for instance the geo-location example described above. The geo-reference database would contain many reference images, each of which contains one or more semantic labeled regions. The inverted file index would permit quick access to all of these reference images. In query time, this permits the method to quickly obtain the reference images which share the same semantics with the query image. As will be described in detail below, the semantic regions obtained from the reference images will be grouped to form spatially connected semantic regions. This will form a set of candidate locations.

Namely, after the fast-pruning has been performed to eliminate highly unlikely matches (as per step 104—where for example images not sharing any semantic regions in common are eliminated from the list of potential matches—see above), for the images that remain—in step 106 the spatial relationship of the semantic regions is taken into account and the list of potential matches is further pruned. The result is a final list of matches which can be given to an analyst for further verification, further pruning, etc. Take, for instance, the geo-location scenario provided above. In that example, in step 106, the list of potential matches of reference images to the query image is further pruned by taking into account the spatial relationship of the semantic labeled regions in the query/reference images. The result will be a final list of reference images which represent possible candidate locations for the query image. As provided above, the final list can be given to an analyst to make a final selection.

According to an exemplary embodiment, step 106 is performed by modeling the spatial relationships of the semantic regions in the images using a spatial graph representing the relative positioning of each semantic region in the image. By way of example only, each semantic region is a node in the spatial graph. If two semantic regions are adjacent to each other in the image, then there is an edge connecting the two corresponding nodes in the graph. For a discussion of spatial graphs see, for example, J. Janssen et al., "Estimating node similarity from co-citation in a graph model," SAC '10 Mar. 22-26, 2012, Sierre, Switzerland, the contents of which are incorporated by reference herein.

Graph matching is then used to compare the images, thus further pruning the list of potential matches. Any suitable graph matching technique may be employed. However, in order to mitigate the complexity of complex graph matching, in one exemplary embodiment, a simplified geometric hashing scheme is used to encode triplets of semantic regions. Geometric hashing is commonly used for object recognition. It involves finding feature points in a model, and using a basis to describe the location of the feature points. In traditional geometric hashing, each time, a pair of points is selected to define the basis, i.e., a coordinate system, which is used to encode the other points by recording the coordinates of those points in the defined coordinate system. In the present simplified scheme, the exact coordinates of a semantic region in the coordinate system defined by two other selected regions is not meaningful. Instead, one just encodes if the coordinates are positive, or negative, indicating on which side of the axis defined by the two selected regions they are. In other words, only the sign of the coordinates is encoded instead of the actual numerical coordinates. This is why this process is called "simplified geometric hashing," the simplification here being that we encode the signs of the coordinates in geometric hashing instead of the full numerics of the coordinates.

This geometric hashing index will be applied only to the noisy set of possible matches (from step 104—see above) on the fly in order to support fast pruning. The pruned list of locations will serve as the final results to a human user. It is then up to the user as to what they want to do with the results. The user might simply want to have a list of potential matches. For instance if the user is searching for geo-location matches for a query image, he/she might simply want a list of potential matches which the user can then further prune based on other factors not taken into consideration here such as specific landmarks, foliage, etc.

According to an exemplary embodiment, the images are ranked based on this geometric verification step. For instance, a score is produced which is determined by how similar the semantic regions are between the images based on the above-described graph matching process. A suitable scoring technique was described in detail in conjunction with the description of step 104, above. The scores from the course-grained matches of step 104 and the refining geometric verification matches of step 106 can then be combined. The combined matching score will serve as the confidence score for each of the images in the final list, and the matched semantic regions along with its spatial arrangement will serve as the supporting illustration of the location recognition results.

Figure 2B:
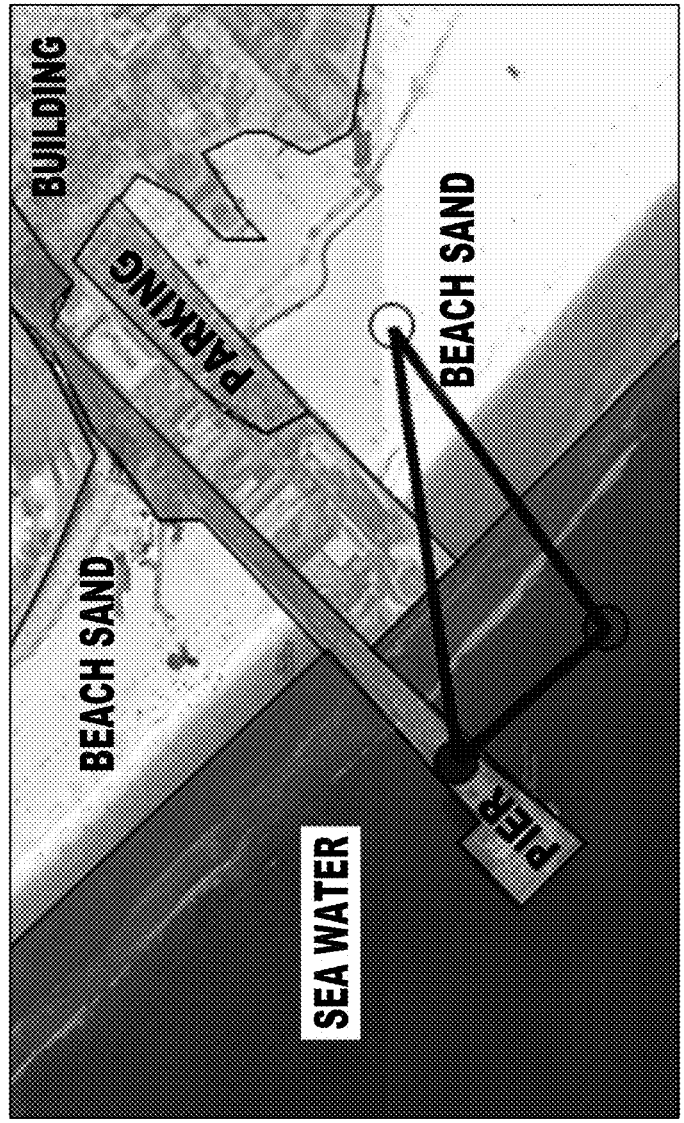
FIG. 2B is a diagram illustrating an exemplary satellite reference image having been parsed into different semantic regions and semantic labels having been assigned to the regions according to an embodiment of the present invention.

FIGS. 2A and 2B provide an example of a query ground-level image and a geo-reference satellite image, respectively, parsed into different semantic regions. As shown in FIG. 2A, the ground-level image has been parsed into multiple spatially connected semantic labeled regions (i.e., regions of different semantic attributes). As provided above, this parsing may be carried out using IMARS based semantic classifiers. In this particular example, the image has been parsed into four different semantic labeled regions, namely "SKY," "PIER," "BEACH SAND," and "SEA WATER. The spatial arrangement of the "PIER," "SEA WATER," and "BEACH SAND" semantic labeled regions is depicted schematically in FIG. 2A. As described above, the spatial arrangement of the semantic regions will be used to prune the list of possible matches. In the exemplary geo-location scenario described above, the ground-level image might be a query image of an unknown location being matched against a database of reference satellite images (see FIG. 2B), the locations of which are known.

As shown in FIG. 2B, a satellite image has been parsed into multiple spatially connected semantic labeled regions (i.e., regions of different semantic attributes)—e.g., using IMARS based semantic classifiers. In this particular example, the image has been parsed into six different semantic regions, namely "SEA WATER," "PIER," "PARKING," "BUILDING," and two "BEACH SAND" regions. By way of example only, the image shown in FIG. 2B may be a possible match for the image of FIG. 2A. Namely, the satellite image contains three semantic regions in common with the ground-level image, "PIER," "BEACH SAND," and "SEA WATER," in the same spatial arrangement. Thus, in the exemplary geo-location scenario described above, the image in FIG. 2B may be of a possible candidate location for the query image in FIG. 2A.

Figure 3:
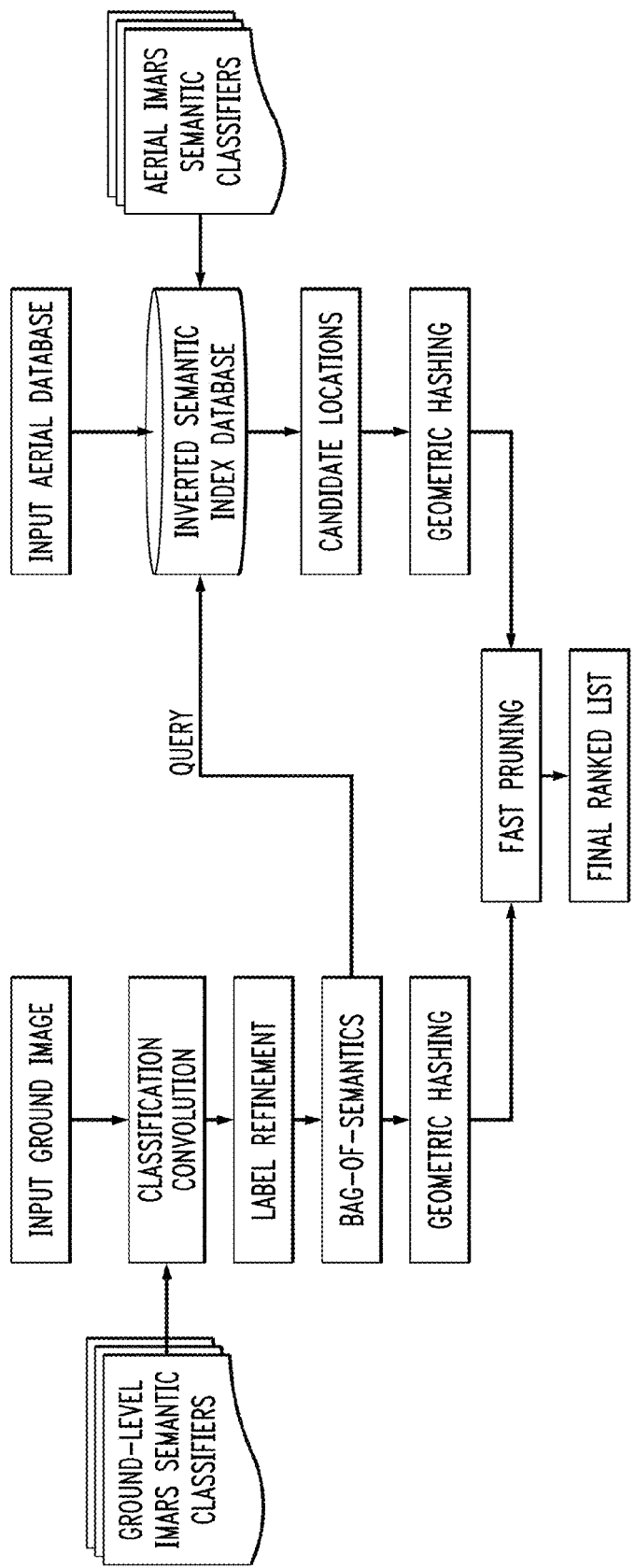
FIG. 3 is a schematic diagram illustrating use of the present techniques for geo-locating a ground-level image of an unknown location based on a database of reference satellite images of known locations according to an embodiment of the present invention.

FIG. 3 is a schematic diagram illustrating use of the present techniques for geo-locating a ground-level (query) image of an unknown location based on a database of reference satellite images of known locations. The satellite images may be provided from a geo-reference database of satellite images (labeled "Input Aerial Database"). As shown in FIG. 3, IMARS semantic classifiers are provided for both the ground-level and satellite images. An exemplary system for generating IMARS based semantic classifiers is provided in FIG. 4, described below. Convolution-based filtering and label refinement may be performed to produce smooth semantic regions. For example, a Gaussian filter can be used to smooth the confidence map produced by the IMARS classifier on the image. This is a simplification of re-enforcing the spatial smoothness of the semantic labels, i.e., neighborhood pixels should have higher probability to have the same semantic label. More sophisticated label refinement could be conducted by formulating a Markov random field (MRF) and then we can pursue a global assignment of semantic labels by jointly considering the output from IMARS classifier and the spatial smoothness of the semantic labels in a single step.

As described above, a "bag of semantics" approach is preferably employed, which permits an inverted file index of the images to be built—allowing for fast pruning of the possible matches. See FIG. 3, where the query is matched against the inverted semantic index database of the reference images. It is notable that the reference images may be pre-processed in the same manner as the query image using the IMARS semantic classifiers.

Figure 5:
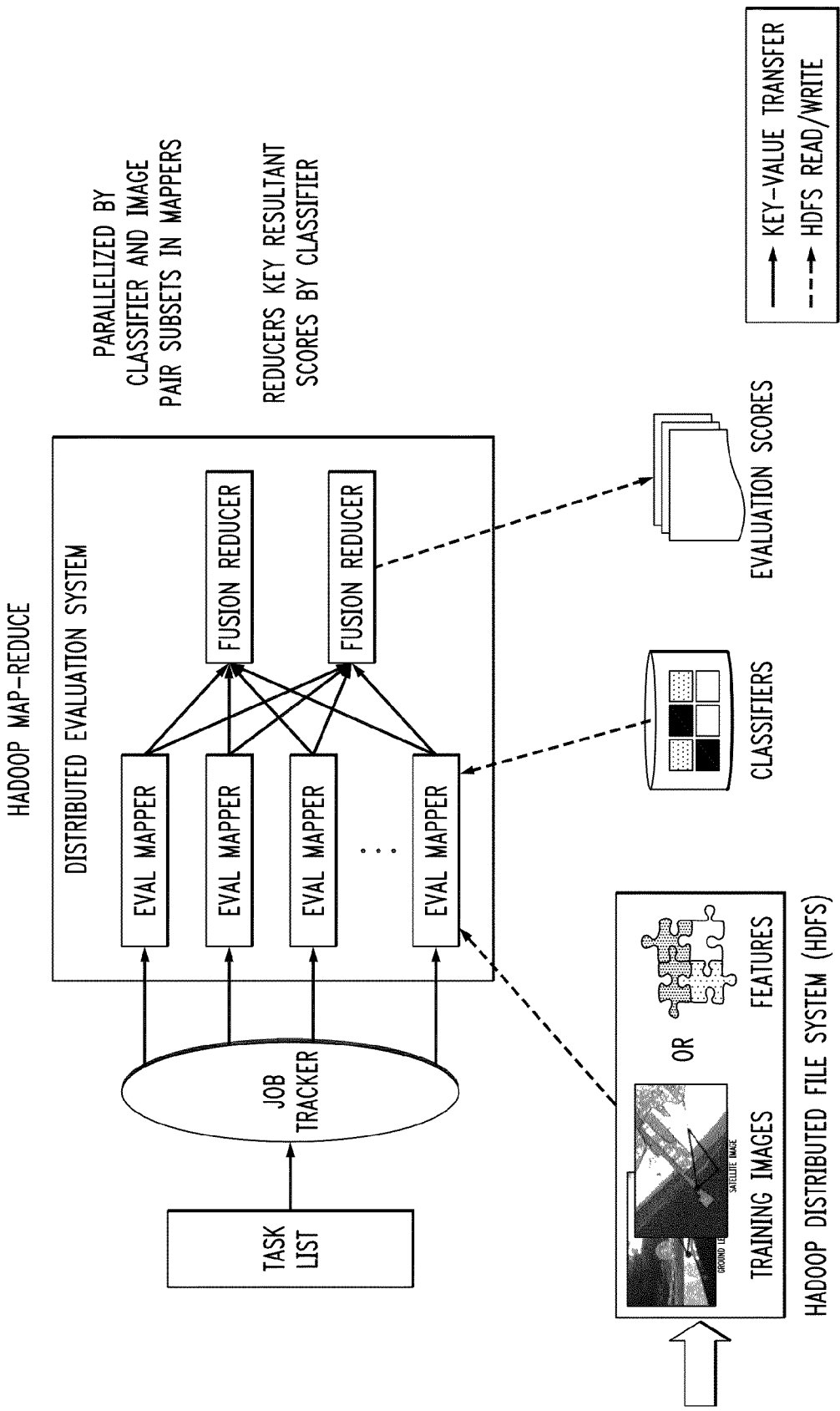
FIG. 5 is a diagram illustrating an IMARS distributed classification scoring system according to an embodiment of the present invention.

The result is a list of possible matching images of "candidate" locations for the query. As provided above, the list is then further pruned using, e.g., a geometric hashing index, to produce a final list of candidate locations. The final list, with a ranking or scoring of the images, is provided to an analyst for further processing. An exemplary IMARS classifier-based scoring system is shown in FIG. 5, described below.

Figure 4:
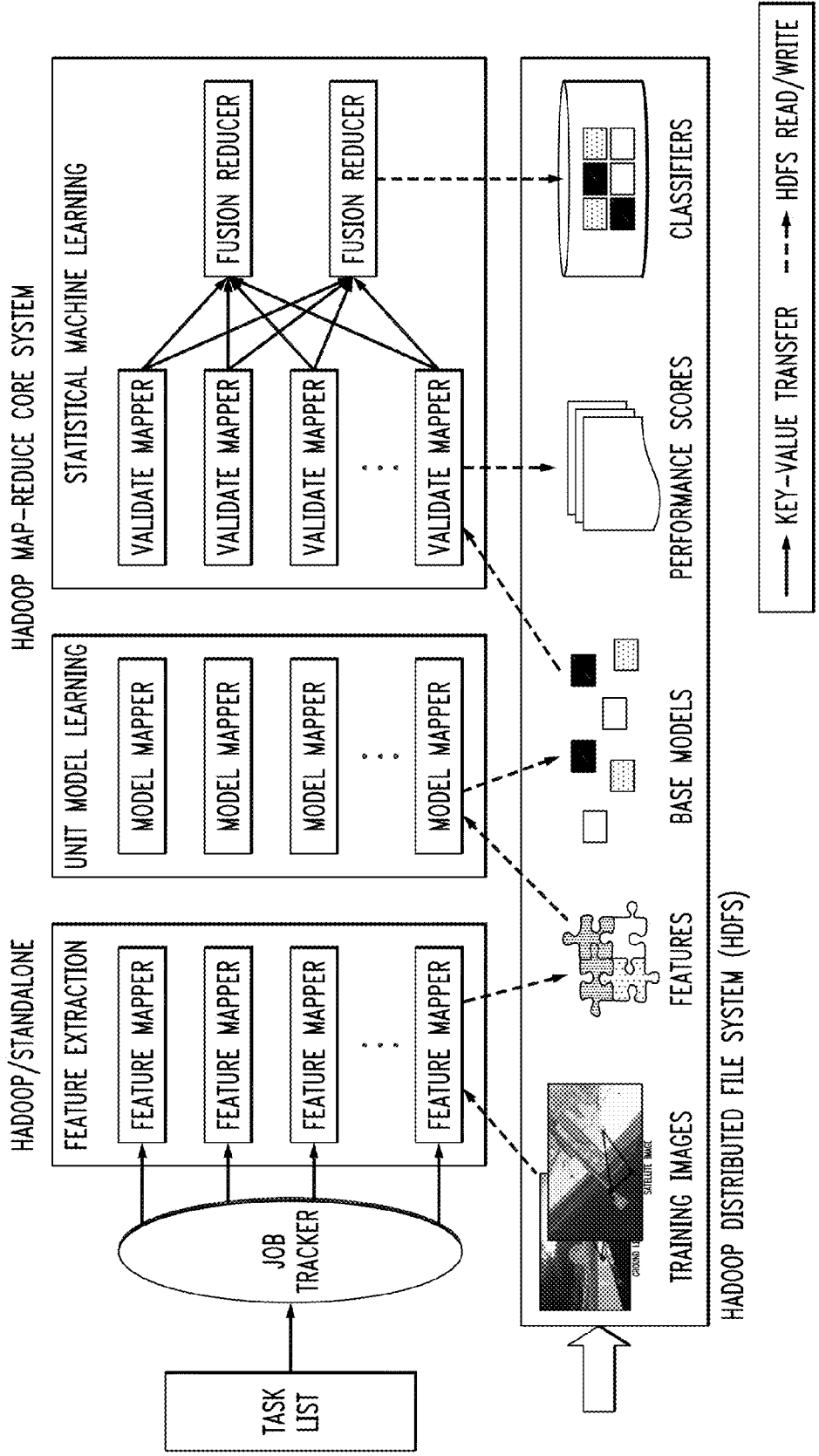
FIG. 4 is a diagram illustrating an IMARS distributed classifier training system for generating semantic classifiers according to an embodiment of the present invention.

As provided above, according to an exemplary embodiment, the labels assigned to the semantic regions are IMARS based semantic classifiers. FIG. 4 is a diagram illustrating an IMARS distributed classifier training system for generating semantic classifiers. In general, the system shown in FIG. 4 is configured to take as input training images from heterogeneous sources and generate a plurality of semantic classifiers from the training data. In the exemplary embodiment shown in FIG. 4, the system is implemented in a distributed Map-Reduce framework, in this case the Apache Hadoop Distributed File System (HDFS). A Map-Reduce model for distributed processing in general involves both Map and Reduce functions for any computation. The Map function first reads a list of input key and associated values, and produces a list of intermediate <key, value> pairs. After grouping and shuffling intermediate pairs with the same keys, the Reduce function is applied to perform merge operations on all of the intermediate pairs for each key, and emits output pairs of <key,value>. See, for example, Yan et al., "Large-Scale Multimedia Semantic Concept Modeling using Robust Subspace Bagging and MapReduce," LS-MMRM '09 Proceedings of the First ACM workshop on Large-scale multimedia retrieval and mining, pgs. 35-42 (October, 2009), the contents of which are incorporated by reference herein. Essentially, the Map-Reduce model transforms a plurality of <key, value> pairs into a list of values. The input and output <key, value> pairs can have different formats. The Map function can be performed in parallel on non-overlapping data partitions. The Reduce function can be performed in parallel on intermediate pairs with the same keys.

In the exemplary system shown in FIG. 4, the map function (labeled "Mapper") contains a feature extraction function, a model learning function, and a validation map function. Training images from heterogeneous sources—e.g., ground-level images, satellite images, bird's eye view images, etc.—are provided as input to the system, organized into a Learning and Validation partition. Unit models are trained on the Learning partition, and then subsequently scored on the Validation partition. The unit models are then combined in a manner that maximizes their aggregation performance on that Validation partition, using a process of forward model selection. By way of example only, the unit models may be support vector machine (SVM) models or any other suitable type of machine learning model.

The feature extraction Map function extracts features from the training images. Such features may include SIFT, GIST, Fourier based features, color histogram, edge histogram, etc. The extracted features are used to train base models. Namely, the extracted features are provided for training purposes to the model learning Map function which generates and stores a pool of base models, without using any reducing function. See FIG. 4. After all of the base models are produced, the validation Map function computes prediction results. The fusion Reduce function then combines multiple models into composite classifiers, in a manner that maximizes their aggregate performance on the validation dataset, such as forward model selection, or any other known technique of model fusion. The exemplary implementation in FIG. 4 employs a well known process of bagging and forward model selection, which has been implemented in Hadoop. It is notable that FIG. 4 represents just one non-limiting example for acquiring the semantic data needed for performing the present techniques. IMARS is just one possibility.

FIG. 5 is a diagram illustrating an IMARS distributed classification scoring system. In general, the system shown in FIG. 5 is configured to take as input images from heterogeneous sources that make up the test corpus, such as either a database of ground level photos or satellite images, and a pool of classifiers and produce an evaluation score. By way of example only, if the model is a support vector machine (SVM) model the process involves using a kernel function to evaluate the features against each one of the support vectors in the model. The model is not however limited to SVM models. It would be within the capabilities of one of ordinary skill in the art to, given the present teachings, employ other machine learning models. As with the semantic classifier training system shown in FIG. 4, this exemplary scoring system may also be implemented in a distributed Map-Reduce framework, such as the Apache Hadoop Distributed File System (HDFS).

In the exemplary system shown in FIG. 4, the map function (labeled "Mapper") contains an evaluation function. The evaluation Map Function assigns classifiers to the input images. In this exemplary MapReduce implementation, the Map function reads the input image and classifiers and produces a list of intermediate classifier and image pairs. Thus, the Map function can be performed in parallel by classifier and image pair subsets in the mappers. The Reduce function can key resultant scores by classifier.

Figure 6:
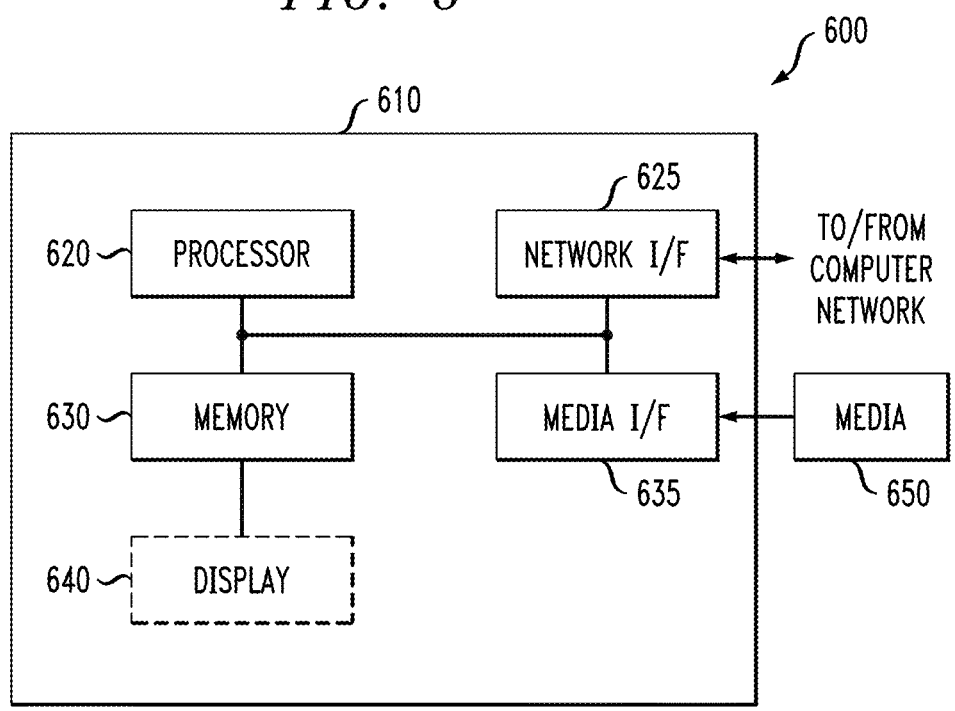
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more of the steps of methodology 100 of FIG. 1 for matching images from heterogeneous sources. Further, the IMARS distributed classifier training system of FIG. 4 and/or the IMARS distributed classification scoring system of FIG. 5, both described above, may be embodied in apparatus 600 which can be configured to perform the classifier training and scoring processes described herein.

Apparatus 600 comprises a computer system 610 and removable media 650. Computer system 610 comprises a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

As is known in the art, the methods and apparatus discussed herein may be distributed as an article of manufacture that itself comprises a machine-readable medium containing one or more programs which when executed implement embodiments of the present invention. For instance, when apparatus 600 is configured to implement one or more of the steps of methodology 100 the machine-readable medium may contain a program configured to (a) parse the images into different semantic labeled regions; (b) create a list of potential matches by matching the images based on two or more of the images having same semantic labeled regions; and (c) prune the list of potential matches created in step (b) by taking into consideration spatial arrangements of the semantic labeled regions in the images.

The machine-readable medium may be a recordable medium (e.g., floppy disks, hard drive, optical disks such as removable media 650, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. An apparatus for matching images across from heterogeneous sources, the apparatus comprising:
    a memory; and
    at least one processor device, coupled to the memory, operative to:
        (a) parse each of the images into different spatially connected semantic labeled regions;
        (b) create a list of potential matches by matching spatial structure-free representations of the images based on two or more of the images having same semantic labeled regions; and
        (c) prune the list of potential matches created in step (b) by then taking into consideration spatial arrangements of the semantic labeled regions in the images by analyzing spatial relationships of the semantic labeled regions in the images,
    wherein the images are parsed into the different semantic labeled regions based on a semantic visual content of the images, and the images from the heterogeneous sources are matched based on the semantic visual content of the images, and wherein the images from the heterogeneous sources comprise photographs from different perspectives and from different modalities.

2. The apparatus of claim 1, wherein the at least one processor device is further operative to:
    build an inverted file index for the semantic labeled regions; and
    use the inverted file index to in step (b) create the list of potential matches.

3. The apparatus of claim 1, wherein the at least one processor device is further operative to:
    use a geometric hashing index to in step (c) prune the list of potential matches by taking into consideration the spatial arrangements of the semantic labeled regions in the images.

4. The apparatus of claim 1, wherein one or more of the images comprise ground level images, and wherein another one or more of the images comprise satellite images.

5. The apparatus of claim 1, wherein one or more of the images comprise ground level images, and wherein another one or more of the images comprise birds-eye view images.

6. The apparatus of claim 1, wherein the at least one processor device is further operative to:
    use IMARS based semantic classifiers to in step (a) parse the images into different semantic labeled regions.

7. The apparatus of claim 1, wherein steps (a)-(c) are performed to geo-locate a query image of an unknown location based on one or more reference images of known locations.

8. The apparatus of claim 7, wherein the query image is a ground level image and the reference images are satellite images.

9. The apparatus of claim 7, wherein the at least one processor device is further operative to:

match the semantic labeled regions in the query image with the semantic labeled regions in the reference images to in step (b) create the list of potential matches.

10. The apparatus of claim 7, wherein the reference images are contained in a geo-reference database.

11. The apparatus of claim 10, wherein the at least one processor device is further operative to:
build an inverted file index which maps the semantic labeled regions with the reference images in the geo-reference database; and
use the inverted file indexing to in step (b) create the list of potential matches.

12. The apparatus of claim 10, wherein the at least one processor device is further operative to:
pre-process the reference images in the geo-reference database, wherein the pre-processing step comprises parsing the reference images into different semantic labeled regions.

13. The apparatus of claim 7, wherein steps (a)-(c) are performed to produce one or more candidate locations.

14. The apparatus of claim 7, wherein the at least one processor device is further operative to:
use IMARS based semantic classifiers to in step (a) parse the query image into different semantic labeled regions.

15. The apparatus of claim 7, wherein the at least one processor device is further operative to:
use IMARS based semantic classifiers to in step (a) parse the reference images into different semantic labeled regions.

16. An article of manufacture for matching images across heterogeneous sources, comprising a non-transitory machine-readable recordable medium containing one or more programs which when executed implement the steps of:
(a) parsing each of the images into different spatially connected semantic labeled regions;
(b) creating a list of potential matches by matching spatial structure-free representations of the images based on two or more of the images having same semantic labeled regions; and
(c) pruning the list of potential matches created in step (b) by then taking into consideration spatial arrangements of the semantic labeled regions in the images by analyzing spatial relationships of the semantic labeled regions in the images,
wherein the images are parsed into the different semantic labeled regions based on a semantic visual content of the images, and the images from the heterogeneous sources are matched based on the semantic visual content of the images, and wherein the images from the heterogeneous sources comprise photographs from different perspectives and from different modalities.

17. The article of manufacture of claim 16, wherein the one or more programs which when executed further implement the steps of:
building an inverted file index for the semantic labeled regions; and
using the inverted file index to in step (b) create the list of potential matches.

18. The article of manufacture of claim 16, wherein the one or more programs which when executed further implement the step of:
using a geometric hashing index to in step (c) prune the list of potential matches by taking into consideration the spatial arrangements of the semantic labeled regions in the images.

19. The article of manufacture of claim 16, wherein the one or more programs which when executed further implement the step of:
using IMARS based semantic classifiers to in step (a) parse the images into different semantic labeled regions.

20. The article of manufacture of claim 16, wherein steps (a)-(c) are performed to geo-locate a query image of an unknown location based on one or more reference images of known locations.

* * * * *